United States Patent [19]

Day

[11] Patent Number: 4,525,099

[45] Date of Patent: Jun. 25, 1985

[54] CONNECTOR FOR TUBULAR FRAME MEMBERS

[75] Inventor: Robert H. Day, Burbank, Calif.

[73] Assignee: S.D.S. Industries, Inc., Los Angeles, Calif.

[21] Appl. No.: 591,855

[22] Filed: Mar. 21, 1984

[51] Int. Cl.³ .......................... B25G 3/20; F16B 2/00
[52] U.S. Cl. ..................................... 403/371; 403/246
[58] Field of Search ............... 403/371, 374, 246, 369; 294/96, 94, 86.25

[56] References Cited

U.S. PATENT DOCUMENTS

| | | | |
|---|---|---|---|
| 1,875,011 | 8/1932 | Johnson | 294/96 X |
| 2,624,610 | 1/1953 | Murphy | 294/96 |
| 2,939,739 | 6/1960 | Grunsky | 294/96 |
| 3,181,100 | 4/1965 | Rogers | 403/374 X |
| 3,701,553 | 10/1972 | Vogt | 403/189 |
| 4,152,086 | 5/1979 | Achenbach et al. | 403/297 X |
| 4,249,830 | 2/1981 | Day | 403/246 X |

Primary Examiner—Andrew V. Kundrat
Attorney, Agent, or Firm—Fred Flam

[57] ABSTRACT

A two part connector with one of said parts providing an elongated cylindrical bore and the other a pin with a flared end, and with an expansible compression ring on the pin urged by a compression spring outwardly of said flared end to grip said bore.

4 Claims, 2 Drawing Figures

U.S. Patent   Jun. 25, 1985   4,525,099
*Fig. 2.*
*Fig. 1.*
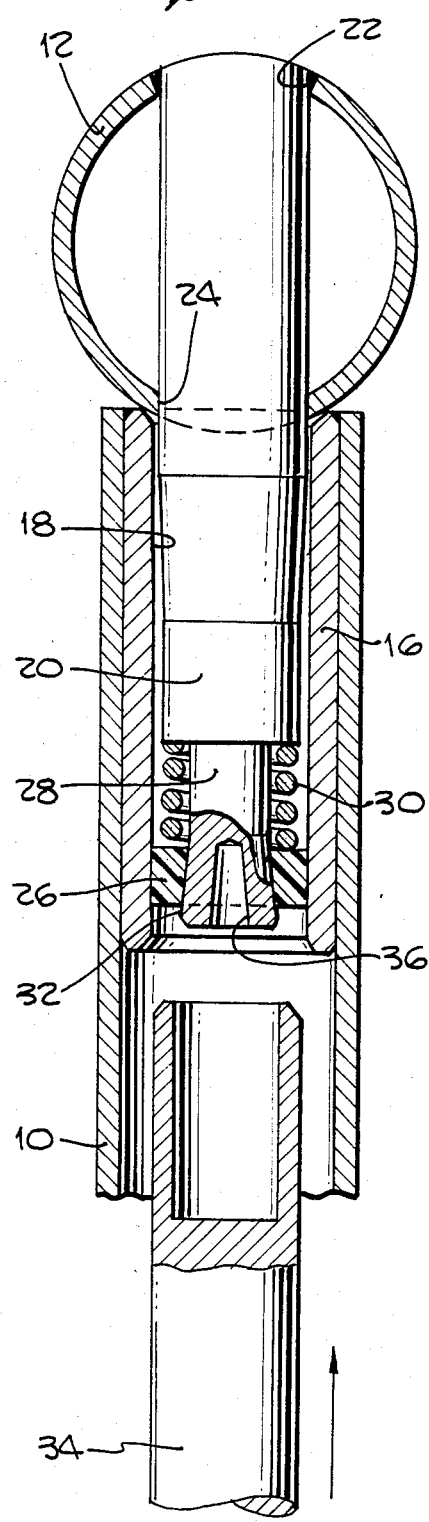
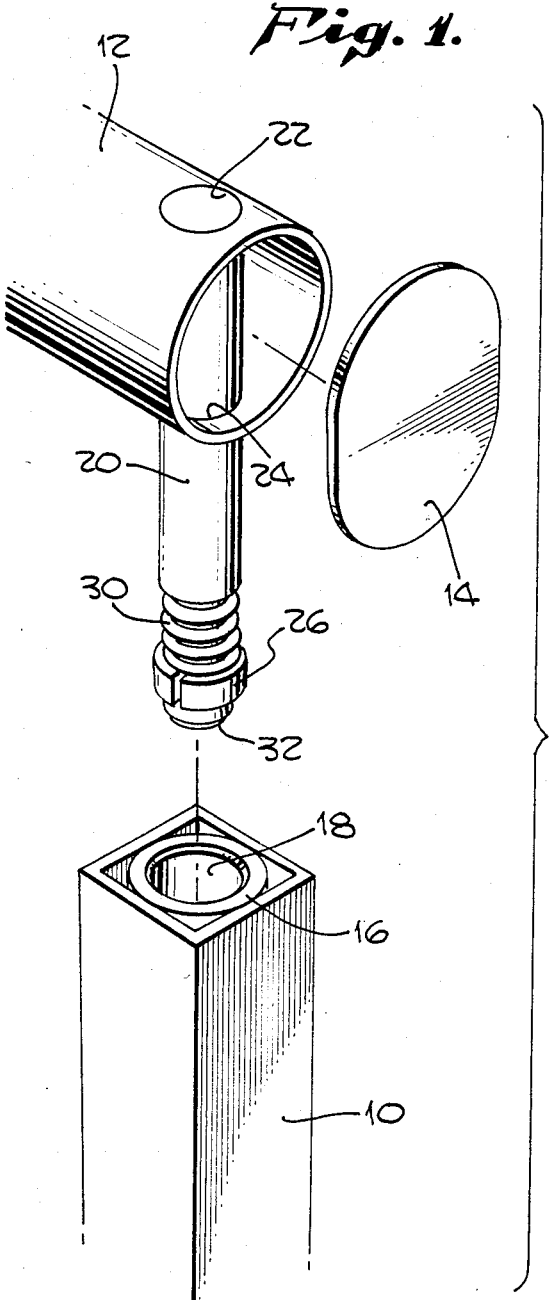

CONNECTOR FOR TUBULAR FRAME MEMBERS

FIELD OF INVENTION

This invention relates to coupling for tubular structures such as display racks or similar store fixtures.

BACKGROUND OF THE INVENTION

The primary object of the present invention is to provide a coupling for tubular structures that will allow simple, but exceedingly secure connection between tubular structures to allow knock down shipment and storage. Known prior art structures utilize a variety of mechanisms, often complicated, such as screw operated wedge structures and the like.

SUMMARY OF THE INVENTION

The connector structure comprises two parts, one part providing an elongated cylindrical bore and affixed inside the end of a tubular structure. The other part is a pin or stud affixed at one end to a companion fixture structure. The pin carries an expandable gripper ring that rides upon the end of the pin, which is outwardly flared. A compression spring urges the ring along the flared end, and consequently into firm engagement with the bore of the first connector part. To assemble the parts, the pin is simply moved into the bore of the first connector part; the compression ring has a nominal diameter about equal to that of the bore so that it easily slides into the bore when the ring is retracted from the flared end of the pin. Such retraction in fact occurs as a result of the simple act of insertion. Thus the expanded ring is stopped at the edge of the bore as the pin advances, which allows the ring to constrict and thus pass into the bore. As the parts move together, the compression spring seats the gripper ring and expands it into firm contact with the bore. Attempted retraction of the pin increases the expansion force and separation is prevented since the parts are fully locked. Separation is possible, however, by firsts retracting the compression spring on the pin, which may be accomplished in a number of ways, as by a tool inserted into a lateral access opening or by a tubular tool inserted into the opposite end of the bored part.

DESCRIPTION OF THE DRAWINGS

A detailed description of the invention will be made with reference to the accompanying drawing wherein like numerals designate corresponding parts in the several figures. These drawings are to scale.

FIG. 1 is an exploded perspective view of two typical fixture members fitted with companion connector parts.

FIG. 2 is an axial sectional view showing the connector parts assembled.

DETAILED DESCRIPTION OF THE PREFERRED EMBODIMENT

The following detailed description is of the best presently contemplated mode of carrying out the invention. This description is not to be taken in a limiting sense, but is made primarily for purposes of illustrating the general principles of the invention, the scope of the invention being defined by the appended claims.

In FIG. 1 two fixture members are illustrated by way of example. One of the members 10 is a tubular standard of square cross sectional configuration. The member 12 in the present instance is a bar of circular cross section designed to cooperate with hooks of clothes hangers. An end plate 14 forms a stop for the hanger hooks.

One part 16 of the connector is inserted into the upper end of the standard 10 and secured, as by welding, to be flush with or slightly recessed within the end of the standard. The part 16 provides a cylindrical bore 18 that is generally elongated. The companion connector part 20 comprises a pin that extends laterally near the end of the hanger bar 12. In order firmly to attach the pin, holes 22 and 24 are drilled at diametrically opposite sides of the bar 12 to fit the pin 20. The pin is welded in position.

The projecting part of the pin 20 is inserted full length into the bore 18. The proximal end of the pin 20 is sized slidingly and closely to fit the bore 18 in order to stabilize the parts against all relative movement save axial movement. The pin is held against axial separation by the aid of a plastic split gripper ring 26. As shown in FIG. 2, the ring 26 is mounted upon a reduced distal part 28 of the pin 20. A compression spring behind the gripper ring 26 urges the gripper ring 26 outwardly and along the flared end 32 of the pin. The ring is thus expanded into firm frictional engagement with the bore. The angularity of the flared end 32 is very slight, and preferably about six degrees so that the mechanical advantage extended to the spring 30 is correspondingly large.

An attempted separation of the fixture part 12 and the pin 20 from the standard 10, as by pulling the part 12 upwardly, is prevented because the pin 20 then further expands the ring 26 into stronger engagement with the bore 18. Thus the fixture parts are very firmly locked together for secure connection. Separation can be achieved, however, by retracting the compression spring from the flared end 32 of the pin. This may be accomplished in a number of ways. For example, the part 10 of the fixture member can be slotted to allow insertion of a small tool. Optionally, a tubular tool 34 can be provided, as shown in FIG. 2. The tool 34, inserted from below, fits into the bore 18 and has an inside diameter just larger than the flared end 32 such that it can engage and retract the gripper ring 26. When retracted, the gripper ring 26 releases. With the tool 34 holding the compression ring 26 retracted, the parts can readily be separated.

The nominal outside diameter of the compression ring 26 is only slightly, if at all, larger than the inside diameter of the bore 18. The outer end of the bore 18 is chamferred to guide the ring 26 into the bore and, if necessary, very slightly to constrict the ring as it enters.

The pin can be flared in any suitable manner. By way of example, a punch (not shown) can be driven into a deep hole 36 at the end of the pin 20 after the compression ring 26 is in place.

Intending to claim all novel, useful and unobvious features shown or described, I make the following claims:

1. A two part connector structure for frame members of a store fixture or the like:
   (a) one of said parts providing an elongated substantially cylindrical bore and adapted to be attached to one of said frame members;
   (b) the other of said parts comprising a pin securely attached to the another of said frame members, and projecting therefrom and adapted to be inserted into said bore, said pin having an axially extended part fitting said bore to stablize said parts against all but relative axial movement;

(c) the end of said pin being outwardly flared;
(d) an expansible compression member mounted on said pin; and
(e) a compression spring urging said compression member outwardly of said flared end firmly to grip the said bore whereby movement of said pin in an outward direction causes said compression member more firmly to engage said bore whereby said frame members are positively locked together.

2. The connector structure of claim 1 in which said compression member being in the form of plastic split gripper ring; said pin having a reduced end on which said compression ring and said spring are mounted.

3. A two part connector structure for hollow frame members of a store fixture or the like:
 (a) one of said parts providing an elongated substantially cylindrical bore and attached substantially flush with the end of one of said frame members;
 (b) the other of said parts comprising a pin securely attached to project laterally of another of said frame members, and adapted to be inserted into said bore; the proximal part of said pin having a size substantially equal to that of said bore in order to stabilize said connector parts against all but axial movement;
 (c) the distal part of said pin being reduced, with its end outwardly flared;
 (d) an expansible compression ring mounted on said distal part of said pin; and
 (e) a coiled compression spring on said distal part and urging said compression ring outwardly of said flared end firmly to grip the said bore whereby movement of said pin in an outward direction causes said compression ring more firmly to engage said bore whereby said frame members are positively locked together.

4. The connector structure of claim 3 in which said flared end has a diameter significantly less than the diameter of said bore whereby a tubular tool may be inserted over said flared end to engage and retract said compression ring thereby releasing said frame members for separating movement.

* * * * *